(12) United States Patent
Müller

(10) Patent No.: US 11,204,122 B2
(45) Date of Patent: Dec. 21, 2021

(54) END STOPPER FOR LINER SYSTEMS

(71) Applicant: Dirk Müller, Wildberg (DE)

(72) Inventor: Dirk Müller, Wildberg (DE)

( * ) Notice: Subject to any disclaimer, the term of this patent is extended or adjusted under 35 U.S.C. 154(b) by 66 days.

(21) Appl. No.: 16/648,166

(22) PCT Filed: Sep. 21, 2018

(86) PCT No.: PCT/DE2018/100802
§ 371 (c)(1),
(2) Date: Mar. 17, 2020

(87) PCT Pub. No.: WO2019/057248
PCT Pub. Date: Mar. 28, 2019

(65) Prior Publication Data
US 2020/0256497 A1  Aug. 13, 2020

(30) Foreign Application Priority Data

Sep. 22, 2017  (DE) ...................... 10 2017 122 041.0

(51) Int. Cl.
| | |
|---|---|
| *F16L 55/165* | (2006.01) |
| *F16L 55/163* | (2006.01) |
| *F16L 55/18* | (2006.01) |
| *E03F 3/06* | (2006.01) |
| *F16L 55/179* | (2006.01) |
| *F16L 55/162* | (2006.01) |

(52) U.S. Cl.
CPC ............. *F16L 55/163* (2013.01); *F16L 55/18* (2013.01); *B32B 2597/00* (2013.01); *E03F 2003/065* (2013.01); *F16L 55/162* (2013.01); *F16L 55/1651* (2013.01); *F16L 55/179* (2013.01)

(58) Field of Classification Search
CPC . F16L 5/08; F16L 55/163; F16L 55/18; F16L 55/1651; F16L 55/179; B29C 63/02; B29C 53/36
USPC .................................. 138/97, 98, 109, 96 R
See application file for complete search history.

(56) References Cited

U.S. PATENT DOCUMENTS

| | | | | |
|---|---|---|---|---|
| 1,821,520 | A * | 9/1931 | Krag ..................... | F16L 57/005 138/96 T |
| 4,233,469 | A * | 11/1980 | Steppe ................. | H02G 3/0616 138/96 T |
| 5,049,003 | A | 9/1991 | Barton | |
| 7,182,611 | B2 * | 2/2007 | Borden .................. | H01R 4/643 439/92 |

(Continued)

FOREIGN PATENT DOCUMENTS

| | | |
|---|---|---|
| DE | 19739006 A1 | 3/1999 |
| EP | 0899493 A1 | 3/1999 |
| EP | 1447609 A1 | 8/2004 |

*Primary Examiner* — Patrick F Brinson
(74) *Attorney, Agent, or Firm* — Smartpat PLC

(57) ABSTRACT

An end stopper (10) for liner systems for pipe and sewer rehabilitation with a liner which is arranged between two end stoppers (10) and can be acted upon by a pressure medium and can be applied reversibly to the circumference of the end stopper (10), is characterized in that the end stopper (10) is composed, in cross section, of a plurality of profile parts (100, 101, 102, 103, 104, 105) which are of part annular and/or part tubular shape and are conical, wherein at least one profile part (100) has a configuration that tapers conically from the inside to the outside.

9 Claims, 3 Drawing Sheets

(56) References Cited

U.S. PATENT DOCUMENTS

| | | | | |
|---|---|---|---|---|
| 8,882,517 B2 * | 11/2014 | Smith | ............... | H01R 4/643 |
| | | | | 439/92 |
| 9,000,310 B2 * | 4/2015 | Smith | ............... | H02G 3/22 |
| | | | | 174/664 |
| 10,203,062 B2 * | 2/2019 | Wind | ............... | F16L 55/10 |
| 2004/0159359 A1 | 8/2004 | Schmidt | | |

* cited by examiner

END STOPPER FOR LINER SYSTEMS

TECHNICAL FIELD

The present disclosure relates to an end stopper for liner systems (hereinafter also referred to as a packer). In the following, end sleeves, end plugs or sealing plugs and sealing sleeves are likewise to be understood as end stoppers.

BACKGROUND

Packers serve for pipe and sewer rehabilitation and usually comprise a sleeve which is arranged between two end stoppers and can be acted upon by a pressure medium for receiving a liner or the like, wherein the sleeve can be applied reversibly to the circumference of the end stoppers. End stoppers of these packers known in the prior art are very laborious and cumbersome to pull out by means of suitable tools (for example, by means of an angle grinder) after their use.

SUMMARY

The present disclosure has for its object to provide an end stopper which eliminates the aforementioned problems and facilitates installation and minimizes the burden on the processor.

The above object is achieved by the end stopper as claimed.

An end stopper of the type mentioned is characterized in that it is composed, in cross section, of a plurality of profile parts which are of part annular and/or part tubular shape and are conical, wherein at least one profile part has a configuration that tapers conically from the inside to the outside.

BRIEF DESCRIPTION OF THE DRAWINGS

Further goals, features, advantages and applications of the end stopper according are apparent from the following description of an embodiment with reference to the drawings.

DETAILED DESCRIPTION

Figure 1:
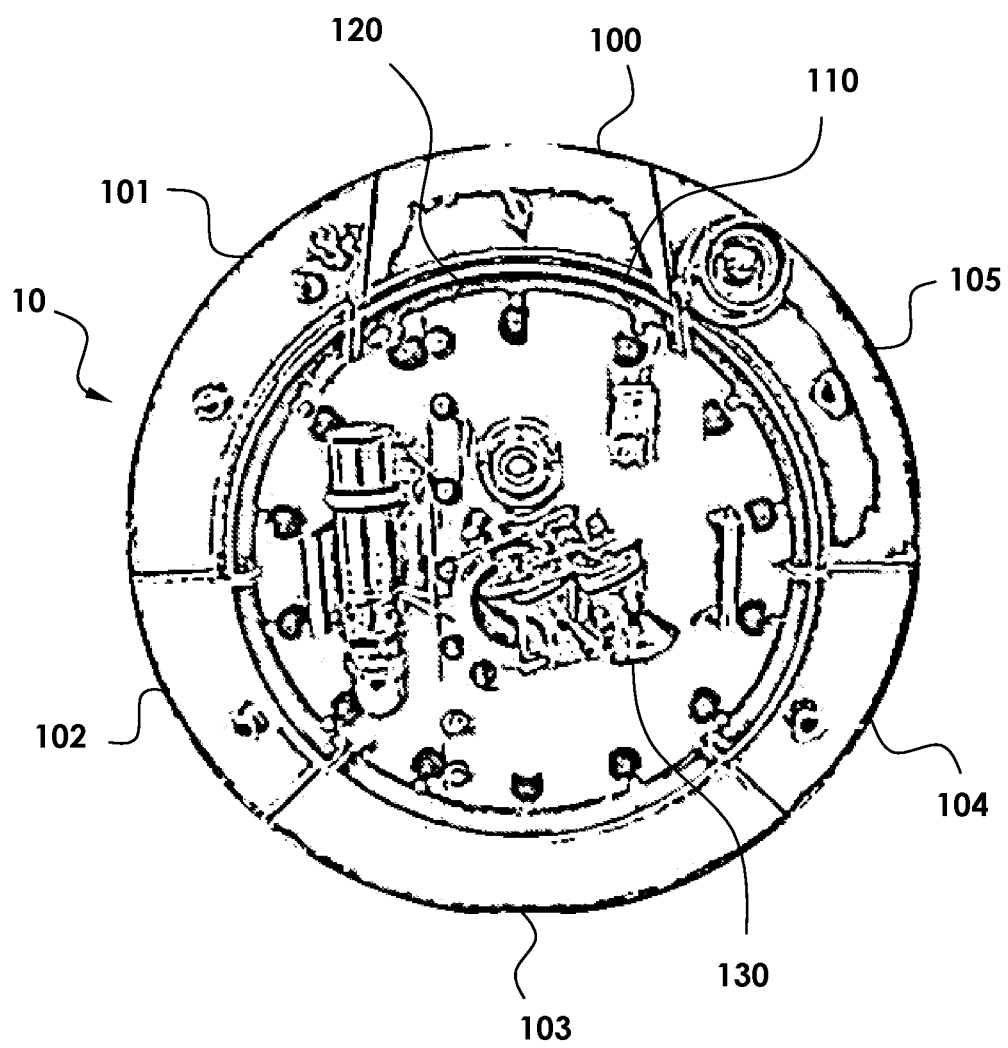
FIG. 1 shows an end stopper in rear view.
Figure 2:
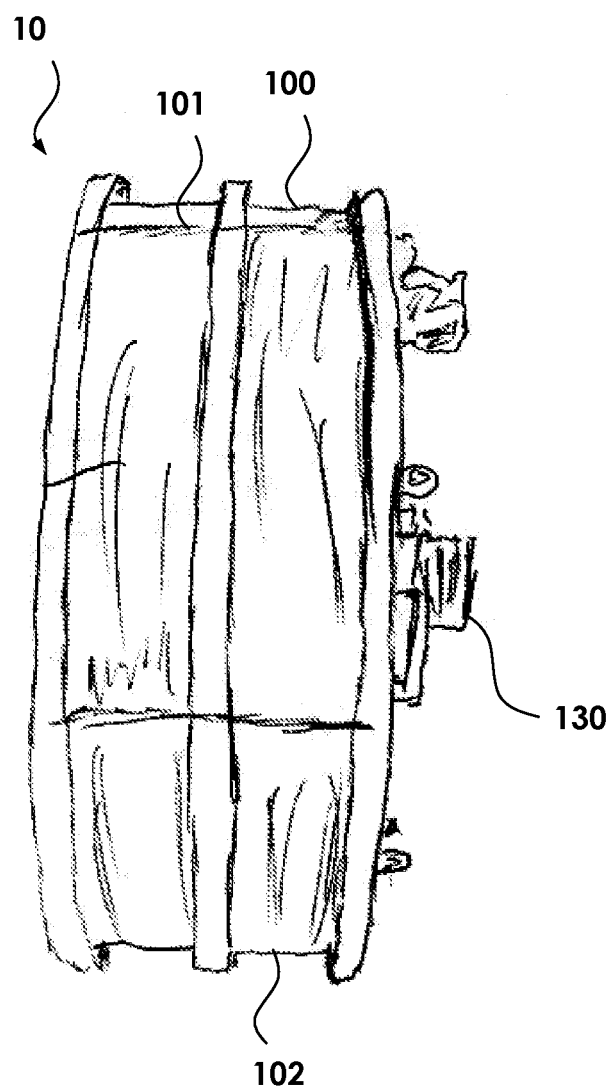
FIG. 2 shows the end stopper in side view.
Figure 3A:
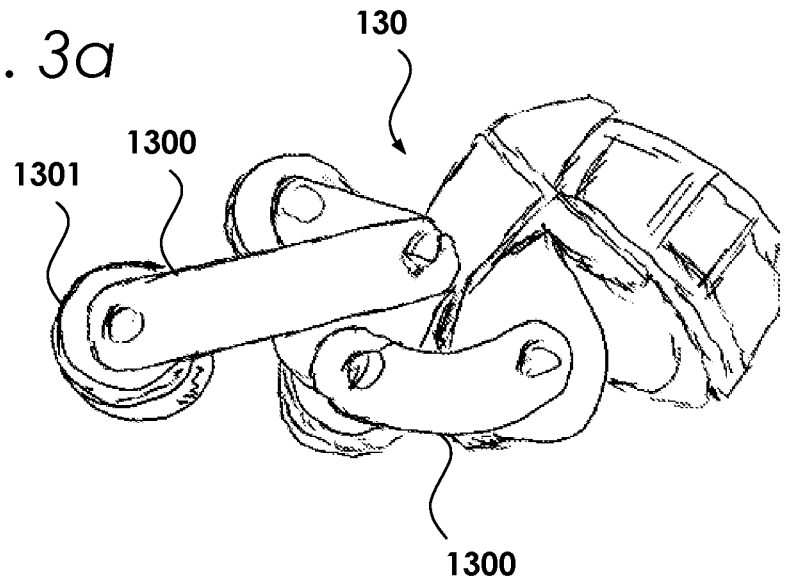
FIGS. 3a-3c show a deflection roller unit in different perspectives.
Figure 3B:
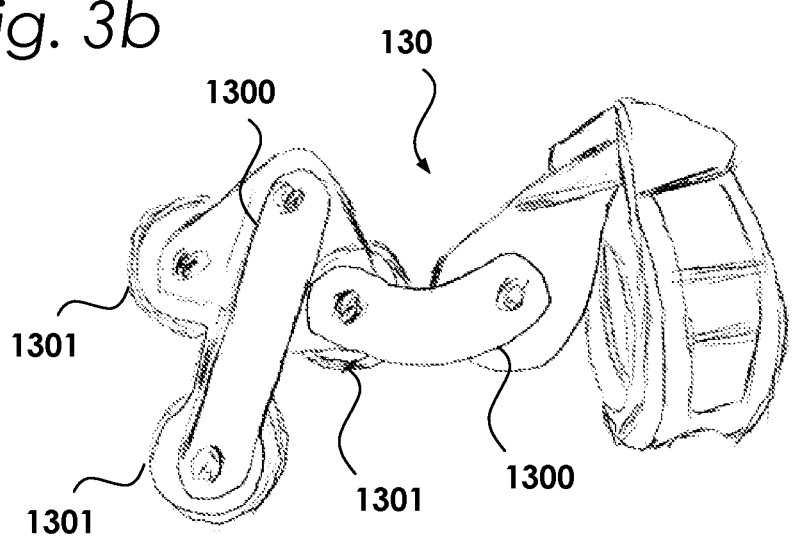
Figure 3C:
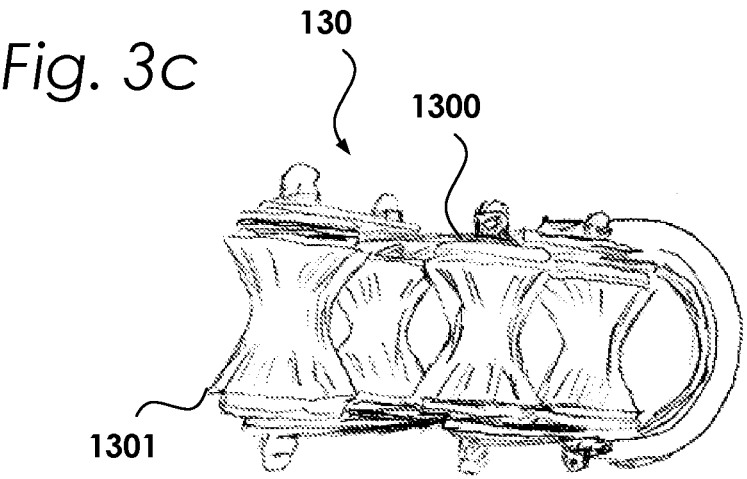

As shown in FIG. 1, the end stopper 10 is formed in a modular design from a plurality of profile parts 100, 101, 102, 103, 104, 105, which are preferably made of light metal (for example, from high-strength aluminum). In addition, the use of plastics, composites and their combination is also possible. The end stopper 10 consists of the body and the cover part 120 with attachments. The weight is thus distributed over a plurality of parts. Lighter weights are possible due to the density that is less than steel. The complete construction is very stable due to the modular construction.

As shown in FIG. 1, the profile parts 100, 101, 102, 103, 104, 105 advantageously lie against one another at their edges in a force-fitting and/or form-fitting manner and can preferably be reversibly be fastened to one another via the sealing surfaces by means of connecting means and/or can be collapsed by means of hinge technology. The complete installation profile of the end stopper 10 is thus implemented via these profile parts 100, 101, 102, 103, 104, 105, whereby the entire body of the end stopper 10 is thus formed very stable.

For this purpose, the profile parts 100, 101, 102, 103, 104, 105 are further preferably equipped with clamping bolts, handles, guide plates, connections, drawbar eyes and sealing surfaces.

The end stopper 10 further comprises at least one cover part 120 which can be closed by the opening 110 formed by the annular or tubular profile parts and which can be applied reversibly and in a force-fitting and/or form-fitting manner on the profile parts 100, 101, 102, 103, 104, 105.

Furthermore, it is advantageous when the profile parts 100, 101, 102, 103, 104, 105 are designed to form a tubular wall of the end stopper 10 for receiving the sleeve.

In order to be able to incorporate a liner with the packer, it is preferably assembled with tensioning and/or clamping elements without a cover part 120. The tension forces on the body must not deform it. The cover part is now connected to the body with turnbuckles or other clamping and joining technology.

Handles, at least one safety valve, a camera holder, a nozzle and a device unit for an advantageously provided deflection roller unit 130 are further preferably located on the cover part 120. The cover part 120 can additionally be divided with connecting elements.

The deflection roller unit 130 advantageously consists of movable side bolsters 1300 with rollers 1301 which are mounted on axles. Furthermore, a catcher roller is preferably provided, which guides the cable or rope in the deflection roller unit 130 when it is relieved. The deflection roller unit 130 is preferably designed such that it can be coupled and thus freely rotated. A further degree of freedom is created by the movable side bolsters 1301. The deflection roller unit 130 can be adapted to and used by all packers on the market.

The packer can rotate independently of the deflection by the embodiment of the deflection roller unit 130, thus the cable and the rope are correctly guided from the nozzle over the deflection. After hardening, the packer must be separated from the integrated liner.

Furthermore, in a particularly advantageous embodiment, a nozzle holder unit is provided, which is arranged on an exchangeable carrier plate. This makes it possible to adapt this packer for different UV plant manufacturers.

LIST OF REFERENCE NUMBERS 10 end stopper
100,101,102,103,104,105 profile parts
110 opening
120 cover part
130 deflection roller
1300 side bolsters
1301 rollers

The invention claimed is:
1. An end stopper (10) for liner systems for pipe and sewer rehabilitation in which a liner is arranged between two end stoppers (10) and acted upon by a pressure medium, the liner being applied reversibly to a circumference of the end stopper (10),
wherein the end stopper (10) is composed, in cross section, of a plurality of profile parts (100, 101, 102, 103, 104, 105) which are of part annular and/or part tubular shape, and
wherein at least one profile part (100) has a configuration that tapers from its inside to its outside.

2. The end stopper (10) according to claim 1, wherein the profile parts (100, 101, 102, 103, 104, 105) lie against one another at their edges in a force-fitting and/or form-fitting manner.

3. The end stopper (10) according to claim 1, wherein the profile parts (100, 101, 102, 103, 104, 105) can be reversibly fastened to one another by connecting means.

4. The end stopper (10) according to claim 3, wherein the profile parts (100, 101, 102, 103, 104, 105) can be collapsed by means of hinge technology.

5. The end stopper (10) according to claim 1, further comprising at least one cover part (120) which can close an opening (110) formed by the profile parts and which can be applied reversibly and in a force-fitting and/or form-fitting manner on the profile parts (100, 101, 102, 103, 104, 105).

6. The end stopper (10) according to claim 1, wherein the profile parts (100, 101, 102, 103, 104, 105) form a tubular wall of the end stopper (10) for receiving a sleeve.

7. The end stopper (10) according to claim 3, further comprising a deflection roller unit (130) for guiding a rope or a cable, the deflection roller unit (120) being located on the at least one cover part (120) and comprising movable side bolsters (1300) with rollers (1301) which are mounted on axles (1302).

8. The end stopper (10) according to claim 7, wherein the deflection roller unit (130) is designed so that it can be coupled and thus freely rotated.

9. The end stopper (10) according to claim 7, wherein the movable side bolsters (1301) are arranged to one another by means of hinge technology such that a further degree of freedom for pivoting/rotation is created.

* * * * *